(12) United States Patent
Brooks et al.

(10) Patent No.: US 12,093,428 B2
(45) Date of Patent: Sep. 17, 2024

(54) RESTRICTING ACCESS TO APPLICATION FUNCTIONALITY BASED UPON WORKING STATUS

(71) Applicant: VMware, Inc., Palo Alto, CA (US)

(72) Inventors: Simon Brooks, Palo Alto, CA (US); Hemant Sahani, Palo Alto, CA (US); Lucas Chen, Atlanta, GA (US); Josh Olson, Prior Lake, MN (US)

(73) Assignee: Omnissa, LLC, Palo Alto, CA (US)

( * ) Notice: Subject to any disclaimer, the term of this patent is extended or adjusted under 35 U.S.C. 154(b) by 171 days.

(21) Appl. No.: 17/141,542

(22) Filed: Jan. 5, 2021

(65) Prior Publication Data
US 2022/0215106 A1 Jul. 7, 2022

(51) Int. Cl.
*G06F 21/62* (2013.01)
*G06F 21/51* (2013.01)
*G06F 21/54* (2013.01)

(52) U.S. Cl.
CPC ............ *G06F 21/629* (2013.01); *G06F 21/51* (2013.01); *G06F 21/54* (2013.01); *G06F 2221/032* (2013.01); *G06F 2221/2141* (2013.01)

(58) Field of Classification Search
CPC ........ G06F 21/629; G06F 21/51; G06F 21/54; G06F 2221/032; G06F 2221/2141
See application file for complete search history.

(56) References Cited

U.S. PATENT DOCUMENTS

| | | | | |
|---|---|---|---|---|
| 10,572,844 B1* | 2/2020 | Westland | ............... | G06F 3/0482 |
| 2006/0247938 A1* | 11/2006 | Thieret | .................. | G06Q 99/00 |
| | | | | 705/7.36 |
| 2010/0114963 A1* | 5/2010 | Brumfield | ............. | G06F 16/954 |
| | | | | 707/E17.107 |
| 2010/0153171 A1* | 6/2010 | Erhart | ..................... | G06Q 10/06 |
| | | | | 705/7.18 |
| 2011/0271251 A1* | 11/2011 | Buckley | ................ | G06F 21/629 |
| | | | | 717/127 |
| 2012/0079110 A1* | 3/2012 | Brown | ................ | G06F 21/6281 |
| | | | | 709/225 |
| 2015/0350222 A1* | 12/2015 | Hashimoto | ........... | H04L 63/102 |
| | | | | 726/3 |
| 2015/0365399 A1* | 12/2015 | Biswas | ............... | H04L 63/0815 |
| | | | | 726/8 |
| 2016/0092685 A1* | 3/2016 | Tse | ....................... | G06F 21/6218 |
| | | | | 726/1 |
| 2016/0330578 A1* | 11/2016 | Moussavian | .......... | G06F 16/957 |
| 2017/0273050 A1* | 9/2017 | Levak | .............. | G01N 33/56972 |
| 2018/0365412 A1* | 12/2018 | Israel | ...................... | H04L 67/10 |

(Continued)

OTHER PUBLICATIONS

"Can you edit the worker status options in Workforce." In ArcGIS Workforce Questions[online]. Feb. 15, 2018 to Jun. 15, 2023 [retrieved on May 14, 2024]. Retrieved from the Internet: https://community.esri.com/t5/arcgis-workforce-questions/can-you-edit-the-worker-status-options-in/td-p/822689 (Year: 2018).*

*Primary Examiner* — Han Yang
*Assistant Examiner* — Zhe Liu
(74) *Attorney, Agent, or Firm* — Kim & Stewart LLP

(57) ABSTRACT

Examples for determining access to restricted features of an application are disclosed. A current working status of a user account and an access policy can be analyzed to determine whether access to the restricted feature should be granted or denied. The functionality can be provided by a library bundled within an application.

17 Claims, 8 Drawing Sheets

(56) References Cited

U.S. PATENT DOCUMENTS

| | | | |
|---|---|---|---|
| 2019/0182260 A1* | 6/2019 | Patel | H04L 63/101 |
| 2019/0220542 A1* | 7/2019 | Estruch Tena | G06F 21/604 |
| 2020/0285761 A1* | 9/2020 | Buck | G06F 21/62 |
| 2020/0304503 A1* | 9/2020 | Zerrad | H04W 12/67 |
| 2021/0006563 A1* | 1/2021 | Rubinstein | G06Q 10/1091 |
| 2022/0166763 A1* | 5/2022 | Hong | H04L 63/0807 |
| 2022/0261661 A1* | 8/2022 | Khaligh | G06Q 10/06314 |
| 2023/0156569 A1* | 5/2023 | Breaux, III | H04W 12/08 381/86 |

* cited by examiner

RESTRICTING ACCESS TO APPLICATION FUNCTIONALITY BASED UPON WORKING STATUS

BACKGROUND

With the emergence of mobile devices in enterprise environments, administrators of an enterprise technology infrastructure face constantly changing security threats to the mobile devices of their users. In some cases, bring-your-own-device (BYOD) policies of an enterprise permit employees or other personnel to use their own devices for business purposes. Devices can be used to access enterprise data, such as email and corporate documents. Additionally, contract or hourly workers might wish to use their own devices for business purposes to access enterprise applications and services. Accordingly, the enterprise might wish to restrict access to certain applications and services depending upon whether an hourly or contract worker is permitted to work at a specified time.

However, existing ways of restricting access to applications and services to hourly and contract workers offer a less than ideal user experience. For example, the enterprise can require the worker to use an enterprise-issued device that the worker receives at the beginning of their shift and returns at the end of their shift, which means that the worker cannot use their own device. Users in such an environment might prefer to use their own devices rather than carry two or more devices. But, the ability of the enterprise to restrict access to applications and services based upon whether the worker is currently working, or "on the clock," can cause administrators to simply disable access to applications and services by these workers from their own devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
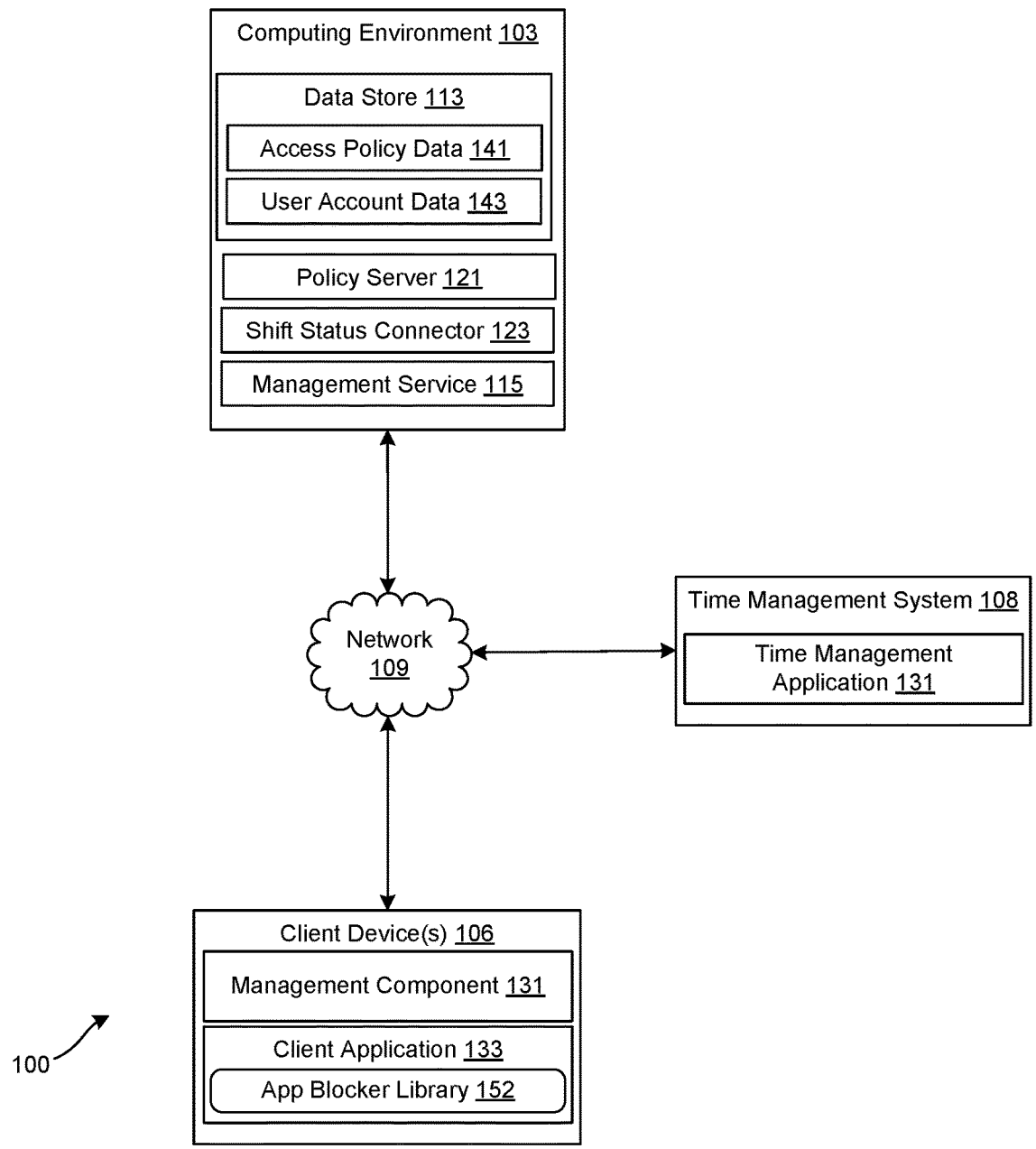
FIG. 1 is a drawing of a networked environment that includes a computing environment and one or more client devices.

The present disclosure relates to restricting access to features within an application, or access to an application itself, based upon whether a user is currently working. An enterprise might wish to limit access to applications or data based upon whether a worker, whether full-time or hourly, is currently working or is "on shift." For example, while a user is not working, the enterprise might wish to limit access to enterprise applications so that the worker does not feel obligated to work or even access work information during non-working hours. Additionally, in an environment where hourly or contract workers utilize their own computing devices such as smartphones for work purposes, enterprises might wish to limit access to enterprise applications or data during non-working hours. In some jurisdictions, laws and regulations might also forbid access to enterprise resources for a worker when the worker is not currently considered working, on the clock, or "on shift."

Prior solutions to limiting access to enterprise applications or resources involve brute force solutions. For example, hourly or shift workers might be prohibited from accessing certain applications or resources from their personal devices. Instead, the enterprise might issue a device to the worker that the worker retrieves when starting his or her shift and returns when the shift ends. As another example of a brute-force solution, the enterprise might prohibit users from accessing enterprise applications or resources on their personal devices.

However, modern workforces are increasingly using their own devices for personal and work purposes. Accordingly, enterprise information technology administrators can utilize examples of the disclosure to provide access to certain features of applications and resources while also limiting the access according to whether a user is currently working. If a user is not working, access to certain features of applications and resources can be denied. Whether a user is working can be determined based upon whether the user is registered as working or "clocked in" according to a time management system.

Applications downloaded by users or deployed to their devices can be made using a software development kit (SDK) that includes an app blocker library with functionality that determines whether to permit access to restricted features of the application. Accordingly, an application developer can identify restricted features of an application and make one or more calls to a library provided by the SDK, which can make the determination of a user's current working status and whether the user should be granted access to the restricted features. By utilizing an SDK library, the application developer need not make the determination of whether the user is granted access to the restricted features or the user's current working status.

According to examples of this disclosure, an access policy can be provided by a policy server that specifies the conditions under which a user is granted access to an application. An access policy can specify that the user is authorized to access certain restricted features of an application based on their current working status. An access policy can also specify other restrictions for access to restricted features, such as a location restriction, a list of a subset of restricted features that are accessible outside of work hours, or a role-based set of restrictions that are dependent upon the user's role within the enterprise.

Accordingly, the app blocker library can determine whether an application should grant access to one or more restricted features based upon the current working status of a user account and the access policy obtained from the policy server. The application can either grant or deny access to certain restricted features based upon the determination made by the app blocker library.

With reference to FIG. 1, shown is an example of a networked environment 100. The networked environment 100 can include a computing environment 103, one or more client devices 106, and a time management system 108 in communication with one another over a network 109. The network 109 can include, for example, the Internet, intranets, extranets, wide area networks (WANs), local area networks (LANs), wired networks, wireless networks, other suitable networks, or any combination of two or more such networks. For example, the networks can include wireless networks, satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement.

The computing devices can be located in a single installation or can be distributed among many different geographical locations. The computing environments 103 can also include or be operated as one or more virtualized computer instances. For purposes of convenience, the computing environment 103 is referred to herein in the singular, although it is understood that a plurality of computing environments 103 can be used. As the computing environment 103 communicates with the client devices 106 remotely over the network 109, the computing environment 103 can be described as a "remote" or a "cloud" computing environment 103.

The computing environment 103 can include a data store 113. The data store 113 can include memory of the computing environment 103, mass storage resources of the computing environment 103, or any other storage resources on which data can be stored by the computing environment 103. The data store 113 can include one or more databases, such as a structured query language (SQL) database, a non-SQL database, or other appropriate database. The data stored in the data store 113, for example, can be associated with the operation of the various applications or functional entities described below.

The components executed on the computing environment 103 can include, for example, the management service 115, the policy server 121, the shift status connector 123, as well as other applications, services, processes, systems, engines, or functionality not discussed in detail herein. The management service 115 can oversee the operation of client devices 106 enrolled as managed devices with the management service 115. In some embodiments, an entity, such as one or more enterprises, companies, or other organizations, can operate the management service 115 to oversee or manage the operation of the client devices 106 of its employees, contractors, customers, or other users having an account with the management service 115.

The management service 115 can install various software components on a client device 106. For example, the management service 115 can install client applications 133, resources, libraries, drivers, configuration profiles, or other components on the client device 106 as specified by an administrator of the management service 115. The management service 115 can also cause policies to be implemented on a client device 106. Policies can include restrictions or permissions pertaining to capabilities of a client device 106 that can pertain to accessing enterprise data on the client device 106.

The management service 115 can interact with one or more client applications 133 executed on the client device 106 to perform management functions. In one example, the management service 115 can interact with a management component 131 on the client device 106, which can carry out various management functions on behalf of the management service 115 on the client device. The management component 131 can be installed when the client device 106 is enrolled as a managed device with the management service 115. When enrolled, the management component 131 can be registered as a device administrator of the client device 106, which can provide the management component 131 with sufficient privileges to control the operation of the client device 106. In one example, the management component 131 can be registered as the device administrator through the installation of a management profile that causes the operating system to designate the management component 131 as the device administrator.

The management service 115 can direct the management component 131 to perform various device management functions on the client device 106. For example, the management service 115 can direct the management component 131 to control access to certain software or hardware functions available on the client device 106. As a result, the management service 115 can verify that the configuration and operation of the client device 106 conforms with pre-defined criteria that ensures that data on the client device 106 is protected from data loss, unauthorized access, or other harmful events.

The management service 115 can also instruct the management component 131 to install other client applications 133 that can provide other capabilities for the user. For example, a client application 133 can include a productivity application, a communication application, a security application, or any other application designated by an administrator as necessary or useful to a user of the device. In one scenario, the management component 131 can install client applications 133 on the device on behalf of the user. In other scenarios, a user can download and install a particular client application 133 on the client device 106 without intervention from the management component 131.

The policy server 121 can be an application or process that can provide access policies to a client application 133 making a determination as to whether a user account should have access to a restricted feature. The policy server 121 can allow an administrator to access and edit access policies. Additionally, an app developer can also provide access policies to the policy server 121 for use by the enterprise based upon a default set of access policies for a particular client application 133.

The shift status connector 123 can connect to the time management system 108 on behalf of a user account to access a current working status of a user account within the time management system 108. The shift status connector 123 can utilize an authentication token or credential associated with a user account to access the current working status of a user account. The current working status can be provided to a client application 133 making a determination of whether to grant access to a restricted feature. The client application 133 can determine whether to grant access to a restricted feature based upon the current working status of the user account as well as the access policy associated with the client application 133 that specifies the conditions under which the restricted feature is accessible.

It should be noted that it is not necessary for a client device 106 to be managed by a management service 115 according to all examples of the disclosure. In some instances, a client device 106 can simply have a client application 133 installed that incorporates the functionality of determining whether a user account is permitted to access restricted features of the client application 133 based upon an access policy and a current working status of the user account.

The data stored in the data store 113 can include, for example, access policy data 141 and user account data 143. In some implementations, the data store 113 can also house data that facilitates operation of the management service 115, such as device profiles, and compliance rules. User account data 143 can include information pertaining to end users of the client devices 106 enrolled with the management service 115. User account data 143 can also include information about an account within the time management system 108 that is associated with a user account in the management service 115 or an enterprise directory. In other words, the user account data 143 can include a reference to a user account in the management service 115 that corresponds to a management service 115 in an enterprise directory service so that examples of the disclosure can determine the current working status of a user account. User account data 143 an include data used to authenticate an end user, such as a username, password, email address, biometric data, device identifier, registry identifier, or other data.

Access policy data 141 can include access policies that specify the rules under which restricted features are accessible by a user. An access policy can identify features in a client application 133 that are inaccessible when a user account is designated as off shift, clocked out, or currently not working by a time management system 108. The access policy can also specify location-based rules or network-based rules for restricted features on a client application 133. For example, the access policy can specify that users in a particular geographic area, or geofence, are permitted to access a restricted feature, but users outside of the geofence are not permitted to access the restricted feature. As another example, the access policy can specify a combination of restrictions based upon the user's employment status, the user's current working status, and/or location that are required to be met before access to a restricted feature is granted.

An access policy can identify a restricted feature in an application and conditions under which the restricted feature is accessible. The conditions under which the restricted feature is accessible can include certain hours in a day, a current working status of a worker, an employment status of a worker, a role within an organization, a title within an organization, or another categorization of a user account. For example, an access policy can specify that users with a certain job title, role, or worker designation are restricted from accessing a particular feature based upon the current working status of a user account corresponding to the user. The access policy can specify that other users with a certain role within an organization can have unrestricted access to the restricted feature. Restricted features can be identified by an access policy using a feature identifier, a textual tag, or another tag by which the feature can be identified by a client application 133.

In some examples, a restricted feature can comprise one or more notifications that a client application 133 can cause the client device 106 to notify the user. The notification can be visual, audible, or a haptic notification. For example, an access policy can specify that a client application 133 should suppress or disable notifications when the current working status of the user account indicates that a user is currently not working.

User account data 143 can include information about user accounts in a particular enterprise. A user account can be an account in an enterprise directory service that provides for user management and access to enterprise resources such as email, documents, identity providers or single sign-on services, and other enterprise resources. Additionally, user account data 143 can include a reference, authentication token, or credentials that allow users to access third party services provided by the enterprise, such as a third-party payroll or time management system 108. Another example of a third-party service can be a customer relationship management tool that federates authentication to a single sign-on service utilized by the enterprise.

In examples of this disclosure, the user account data 143 can include a reference to a user account in the time management system 108 in which users can clock in and clock out to indicate whether they are currently on-shift or off-shift. In some implementations, the reference can be a token with which a user account in the time management system 108 can be accessed so that a current working status or user schedule in the time management system 108 can be retrieved by the computing environment 103.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system that runs a management component 131 and various client applications 133. The management component 131 can be a portion of the operating system or a standalone component that manages the client device 106 on behalf of the management service 115. The management component 131 can enforce compliance rules and policies, install configuration profiles, and perform other management actions on the client device 106 on behalf of the remotely executed management service 115.

In some examples, at least a portion of the client applications 133 are "managed applications" where the management service 115 can oversee or control operation of the client applications 133. For instance, using an administrator console, an administrator of the management service 115 can distribute, secure, and track client applications 133 installed on client devices 106 enrolled with the management service 115.

A client application 133 according to the disclosure can be any application that incorporates the functionality described herein that enables restricted features to be enabled or disabled based upon a user account current working status and/or an access policy. A client application 133 can be instrumented with an app blocker library 152. Certain client applications 133 that are created using a particular SDK that includes libraries such as the app blocker library 152 according to this disclosure.

The app blocker library 152 can implement the tasks of determining whether a user account is permitted to access a restricted feature so that the developer of the client application 133 does not have to make this determination. The app blocker library 152 can work in concert with the management component 131 to determine the user's identity and identify a user account associated with the client device 106 and with the user in a time management system 108 to determine applicable access policies and current working status for the user.

The app blocker library 152 can be implemented as functionality within the client application 133, respectively. In one implementation, the app blocker library 152 can be implemented in code that is native to the client device 106. For example, in the case of an iOS® device, the app blocker library 152 can be implemented in Swift and compiled into native iOS code along with the client application 133 using the SDK. In the case of an Android device, the app blocker library 152 can be implemented in Kotlin and compiled into machine executable code on an Android device.

The client application 133 can be instrumented to invoke the functionality of the app blocker library 152 by more one or more API calls to the app blocker library 152. The API calls can allow the client application 133 to request the app blocker library 152 to make a determination of whether the client application 133 should grant access to a restricted feature within the client application 133. The request can identify the restricted feature, or multiple restricted features, with an identifier, and the app blocker library 152 can respond to the API call with an indication of whether the client application 133 should display or grant access to the restricted feature. In some implementations, the app blocker library 152 can cause the client application 133 to display a blocker user interface (UI) that communicates to the user that the restricted features are unavailable to the user in the event that the app blocker library 152 determines that the restricted features should not be available to the user account.

The time management system 108 can include, for example, a server computer or any other system providing computing capability. Alternatively, the time management system 108 can include a plurality of computing devices that are arranged, for example, in one or more server banks, computer banks, or other arrangements. The time management system 108 can include a grid computing resource or any other distributed computing arrangement.

The time management system 108 can be a third-party system or a system managed by the enterprise that manages worker schedules, time-tracking, and other human resources related functions. In the context of this disclosure, the time management system 108 can be a system from which the management service 115 or shift status connector 123 can determine whether a user account is currently on shift, or "clocked in." Users can clock into the time management system 108 using a user interface provided by the time management system 108. Users can also view additional information about their work schedule, compensation, or other employee benefits information using the time management system 108.

Figure 2:
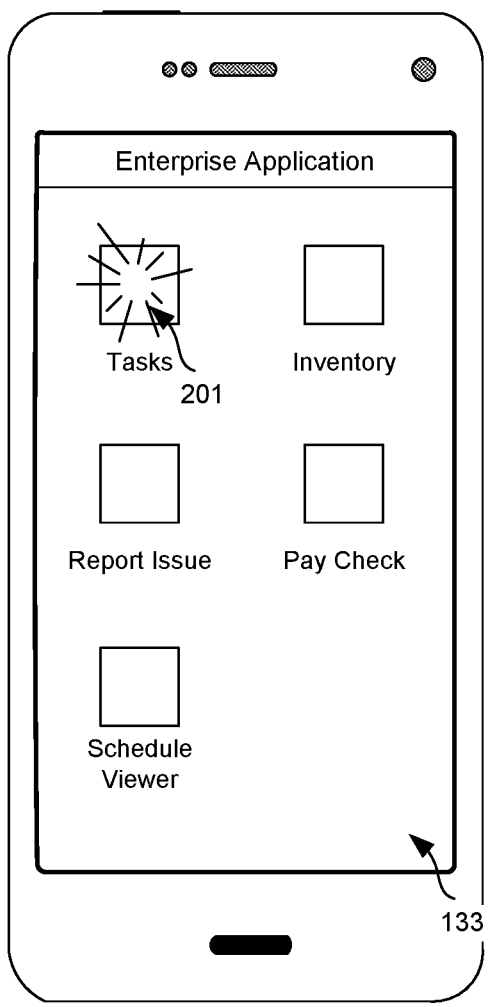
FIG. 2 is a user interface illustrating functionality according to examples of the disclosure.

Referring next to FIG. 2, shown is an example client application 133 according to examples of the disclosure. The client application 133 can be created with the app blocker library 152, which can determine whether restricted features should be made available to a user. As shown in the example of FIG. 2, the client application 133 can provide various features to the user. Some of the users can be designated as restricted features that are accessible according to an access policy, while others can be designated as unrestricted features that are accessible at any time. In the scenario shown in FIG. 2, the tasks 201 feature can be considered a restricted feature that is only accessible to a user in a when a time management system 108 for the enterprise. In FIG. 2, the user has selected the tasks 201 feature.

Figure 3:
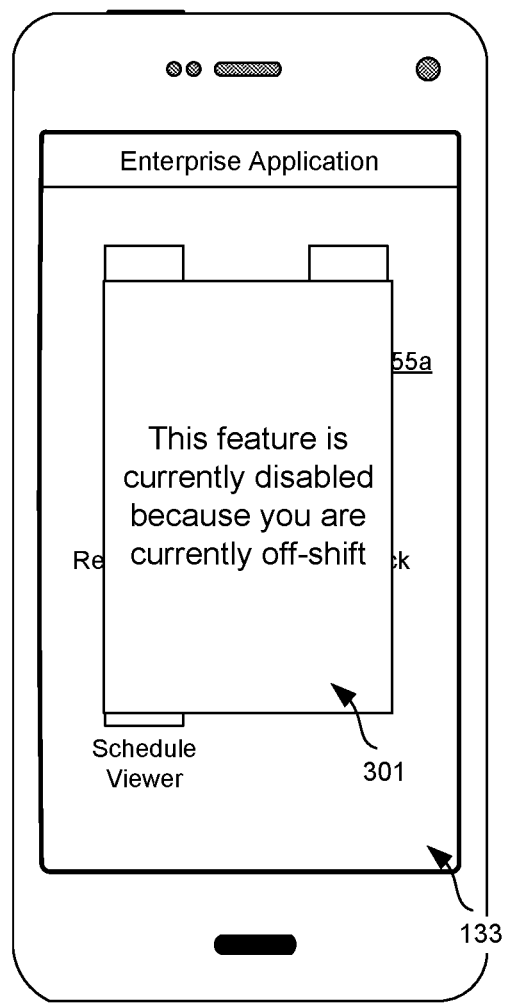
FIG. 3 is a user interface illustrating functionality according to examples of the disclosure.

Continuing the scenario of FIG. 2, reference is now made to FIG. 3. In FIG. 3, the client application 133 has determined, using the app blocker library 152, that the tasks 201 feature is a restricted feature that the user account is not permitted to access. Accordingly, the client application 133 can display a blocker UI 301. The blocker UI 301 can inform the user the reason why the user is not permitted to access the tasks 201 feature.

To implement the scenario shown in FIG. 3, the app blocker library 152 can determine that a user account associated with client device 106 executing the client application 133 is not permitted to access the tasks 201 feature based upon the current working status of the user account in the time management system 108 and an access policy for the application that can be obtained from the policy server 121. The app blocker library 152 can identify a user account with which the user is currently logged in on the client device 106. The app blocker library 152 can then request the current working status of the user account from the shift status connector 123. The shift status connector 123 can then identify user account within the time management system 108 that corresponds to the user account associated with the client application 133 by consulting the user account data 143. The shift status connector 123 can respond to the app blocker library 152 with an indication of the user accounts current working status in the time management system 108.

The app blocker library 152 can also request an access policy for the client application 133 from the policy server 121. The policy server 121 can respond to the app blocker library 152 with the access policy of the application. The access policy can outline conditions under restricted features are accessible to users of the client application 133.

Accordingly, in the scenario of FIG. 3, the app blocker library 152 can determine from the current working status and the access policy that the restricted feature selected by the user is not permitted to be accessed. The app blocker library 152 can cause the client application 133 to display the blocker UI 301. The app blocker library 152 can also instruct the client application 133 to disable access to the feature that the user attempts to access.

Figure 4:
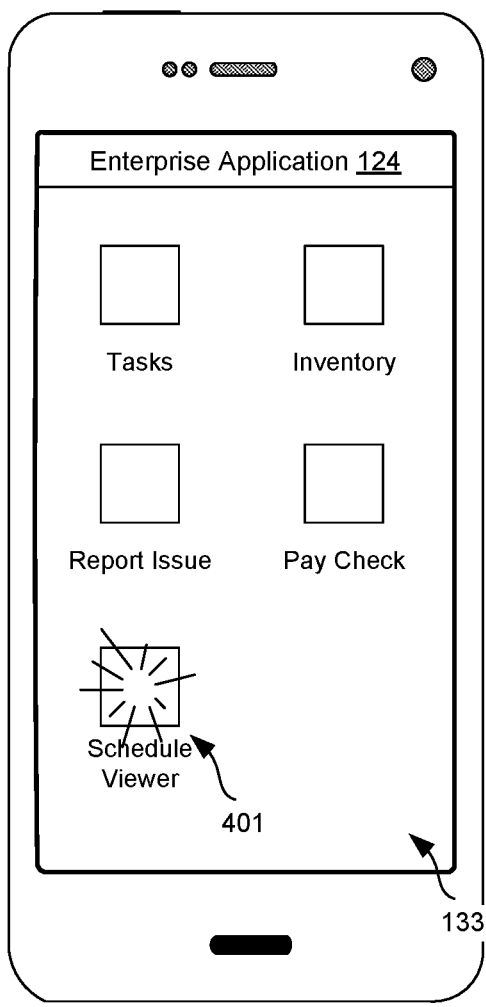
FIG. 4 is a user interface illustrating functionality according to examples of the disclosure.

Continuing the example of FIGS. 2-3, reference is now made to FIG. 4. In the scenario of FIG. 4, the user has selected a different feature of the client application 133. The feature 401 can also be a restricted feature of the client application 133 that is identified in an access policy corresponding to the client application 133. Accordingly, the client application 133 can make one or more API calls to the app blocker library 152 and determine whether the feature 401 should be made accessible to the user. The app blocker library 152 can respond with an indication that the feature 401 is accessible to the user based upon the user's current working status and the access policy.

Figure 5:
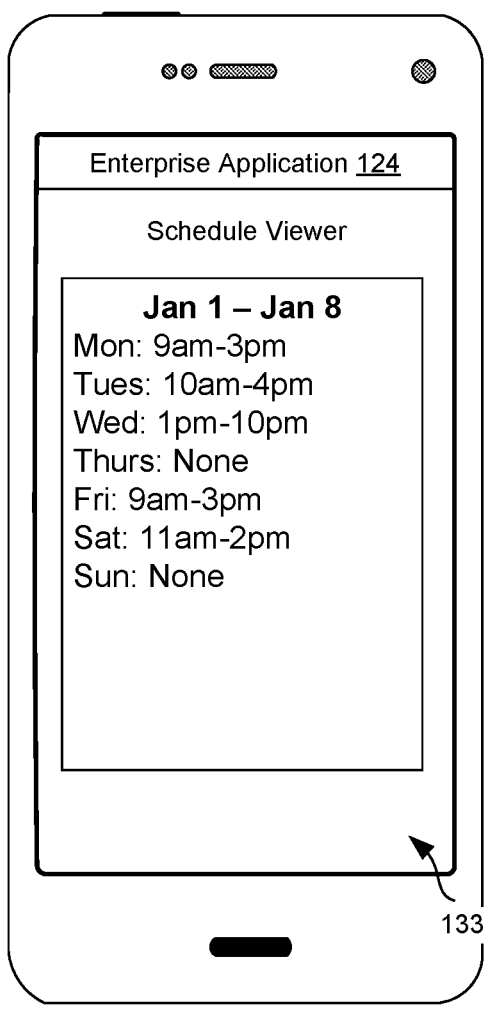
FIG. 5 is a user interface illustrating functionality according to examples of the disclosure.

Accordingly, as shown in FIG. 5, the client application 133 can allow the user to access the feature 401. In some instances, an enterprise might wish to provide access to certain features of an application when the user is working, or on-shift, and deny access to other features of the client application 133 when the user is not working, or is off-shift, and vice versa. Additionally, the enterprise might wish to allow access to all features of a client application 133 regardless of the current working status but may wish to restrict access to the feature based upon other parameters, such as geographic location, IP address, or other aspects of the client device 106 that can be detected by the app blocker library 152. In some examples, the app blocker library 152 can request the management service 115 to determine whether the client device 106 is in compliance with other compliance rules to determine whether access to the restricted feature should be granted.

Figure 6:
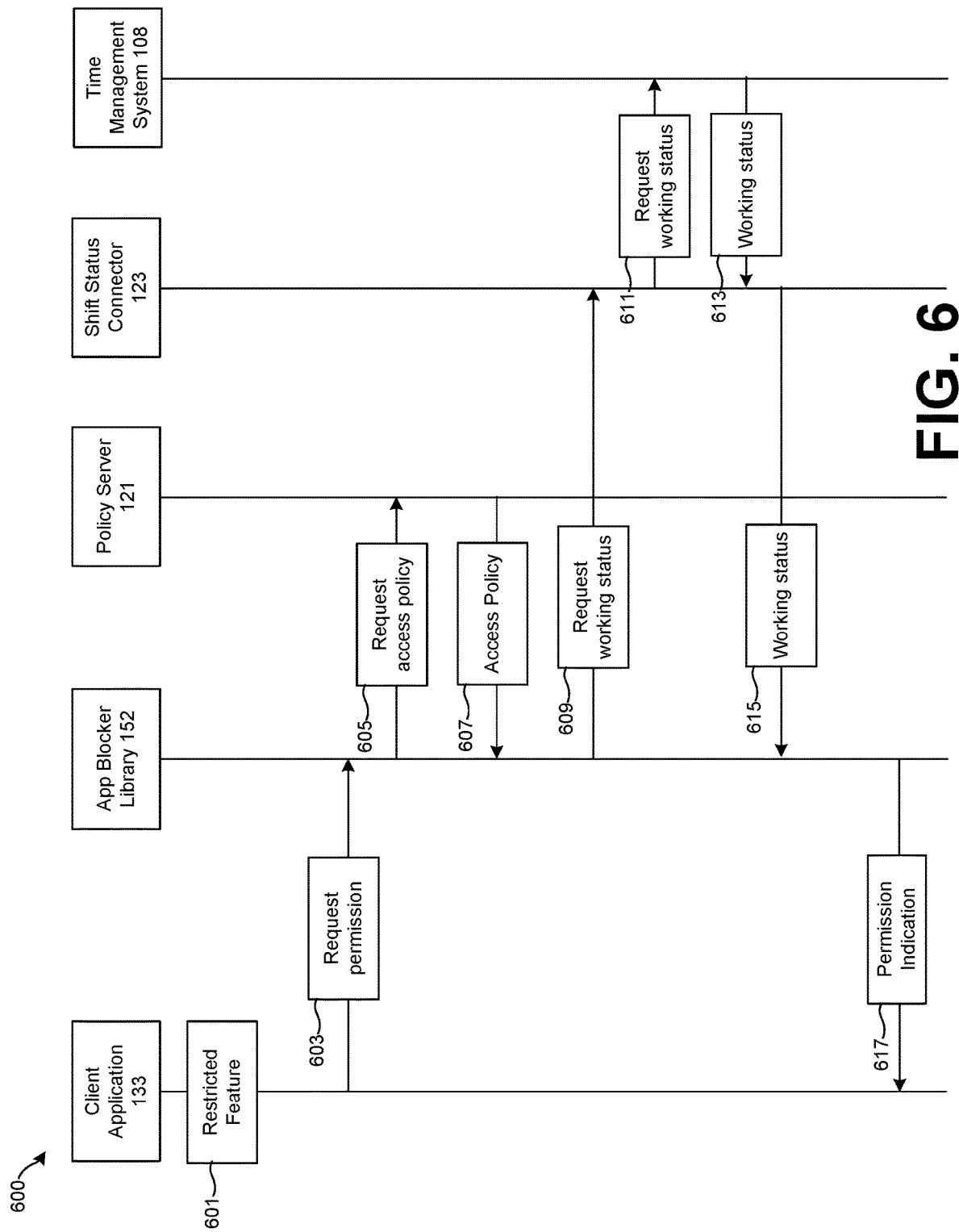
FIG. 6 is a sequence diagram illustrating functionality implemented by components of the networked environment.

Referring next to FIG. 6, a sequence diagram 600 is shown illustrating functionality implemented by components of the networked environment 100. The sequence diagram 600 of FIG. 6 illustrates how the app blocker library 152 within a client application 133 can determine whether a restricted feature within an application should be accessible to a user account that is associated with the client application 133. In other words, the app blocker library 152 can determine whether a currently logged in user it entitled to access a particular restricted feature within the client application 133.

Beginning with step 601, the client application 133 can identify an attempt to access a restricted feature within the client application 133. The client application 133 can then request permission from the app blocker library 152 to provide access to the restricted feature. The request can take the form of one or more API calls to the app blocker library 152. The request can include an identifier that identifies the restricted feature, such as a textual tag or numerical identifier.

At step 605, the app blocker library 152 can request an access policy associated with the restricted feature or the client application 133. In some implementations, the access policy can be bundled or cached within the client application 133 so that the app blocker library 152 does not have to request the access policy each time a user attempts to access a restricted feature. The request at step 605 can be made to the policy server 121. At step 607, the policy server 121 can provide the access policy corresponding to the client application 133 or the requested restricted feature to the app blocker library 152. The access policy can outline the rules under which access to the restricted feature should be granted or denied.

At step 609, the app blocker library 152 can request a current working status associated with the user account from the shift status connector 123. The app blocker library 152 can request the current working status from the shift status connector 123 rather than the time management system 108 so that the logic to make such a request to a time management system 108 that could be managed by a third party does not have to be bundled within the application. By not bundling the logic to access the time management system 108 within the app blocker library 152, the app blocker library 152 can support multiple time management systems that might be provided by varying third parties with varying API's or protocols. The shift status connector 123 can be updated with the varying logic or API's for accessing various implementations of a time management system 108 without requiring the app blocker library 152 to be continually updated with the appropriate logic for accessing the time management system 108. In some implementations, the app blocker library 152 an also cache the current working status associated with the user account rather than requesting the current working status from the shift status connector 123 each time a determination as to the current working status is made.

At step 611, the shift status connector 123 can request the current working status of a user account associated with the request to access the restricted feature. The shift status connector 123 can determine a user account within the time management system 108. The shift status connector 123 can utilize an authentication credential or token associated with the user account in the time management system 108 to access the time management system 108 on behalf of the user account and determine the current working status of the user. In some implementations, the shift status connector 123 can utilize a different authentication credential or token that has sufficient privileges to obtain the current working status of the user account.

At step 613, the shift status connector 123 can obtain the current working status of the user from the time management system 108. The current working status can indicate whether the user associated with the user account is currently working, on-shift, or clocked into the time management system 108. At step 615, the current working status can be provided to the app blocker library 152. In some examples, the shift status connector 123 can receive a shift status update and cache the current status of a user account to avoid the need to request the current status from the time management system 108 each time the app blocker library 152 requests the current working status.

The app blocker library 152 can then make a determination of whether the user is permitted to access the requested feature of the client application 133. An indication of whether the user is permitted to access the requested feature can be provided to portion of the client application 133 code that made the request at step 617. In some examples, the app blocker library 152 can cause a blocker UI 301 to be displayed within the client application 133 or cause the client application 133 to display the blocker UI 301.

Figure 7:
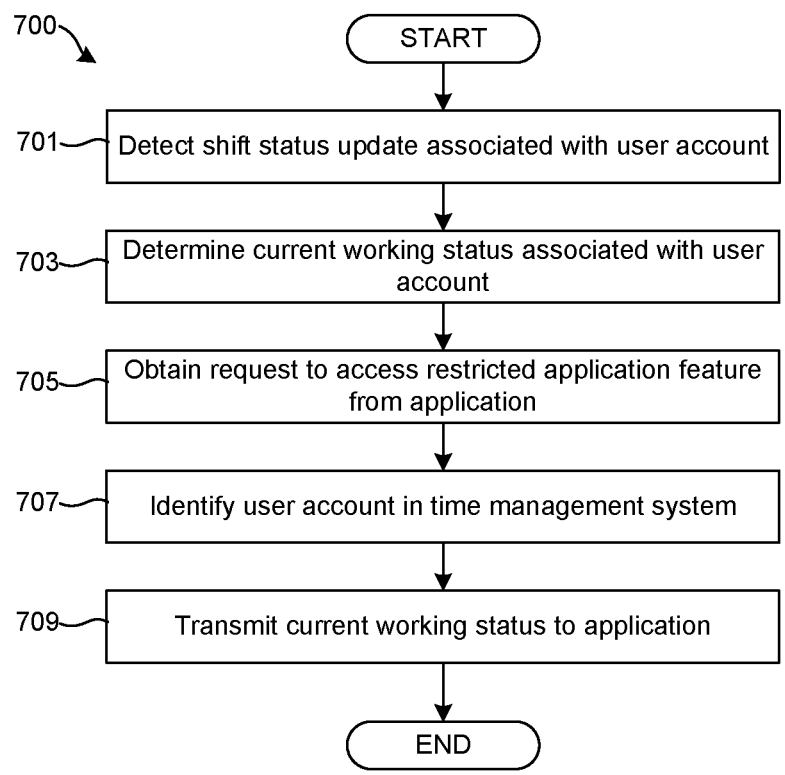
FIG. 7 is a flowchart illustrating functionality implemented by components of the networked environment.

Referring next to FIG. 7, shown is a flowchart 700 that provides one example of the operation of a portion of the computing environment 103. The flowchart 700 can be viewed as depicting an example of elements of a method implemented by the shift status connector 123 according to various embodiments of the disclosure. The separation or segmentation of functionality as discussed herein is presented for illustrative purposes only.

At step 701, the shift status connector 123 can detect a shift status update in the time management system 108 associated with a user account. A shift status update can be a change in the current working status of a user. For example, if the user clocks in, or begins the workday, a shift status update can be generated in the time management system 108. As another example, when the user clocks out at the end of a workday or during a break, a shift status update can be generated that reflects the change in the current working status of the user account.

At step 703, the shift status connector 123 can determine the current working status of the user account. The shift status connector 123 can also determine a user account in the enterprise that corresponds to a potentially different user account in the time management system 108. The shift status connector 123 can then store the shift status update in the data store 113 with the user account data 143 corresponding to the user account.

At step 705, the shift status connector 123 can obtain a request to determine the current working status of a user account that is associated with a request to access a restricted feature in a client application 133. The request can be received from the app blocker library 152 of a client application 133 that is created with the functionality of the app blocker library 152. The request can include an identifier associated with a user account of the user.

A step 707, the shift status connector 123 can determine a user account in the time management system 108 that is associated with the request. At step 709, the shift status connector 123 can provide the current working status of the user account to the requesting app blocker library 152 in a client application 133. The current working status can indicate whether the user account is designated as on-shift or off-shift. The current working status can also indicate additional information about the user account that the app blocker library 152 can utilize to make a determination about a restricted feature, such as a role within an enterprise. Thereafter, the process can proceed to completion.

Figure 8:
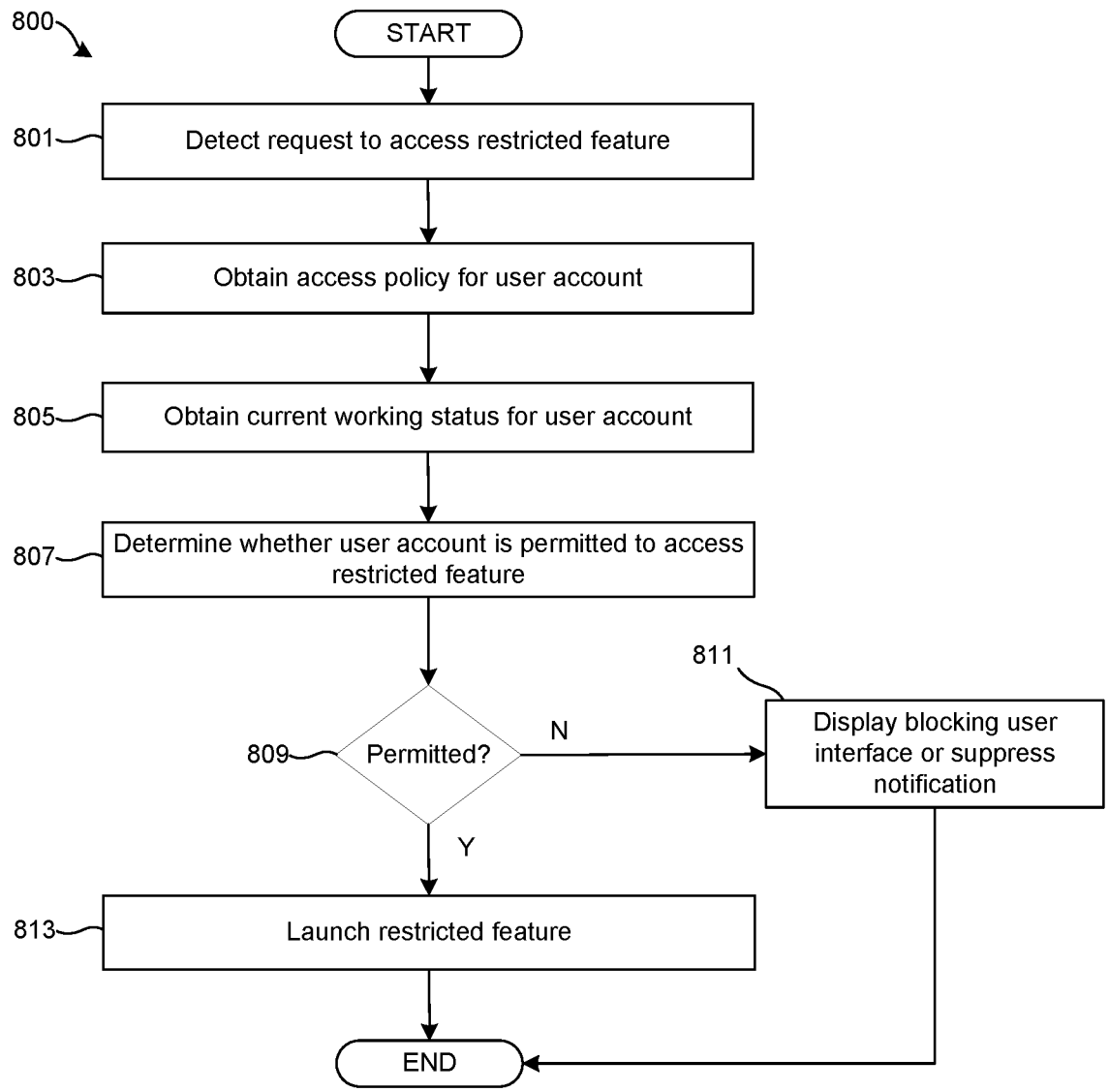
FIG. 8 is a flowchart illustrating functionality implemented by components of the networked environment.

Referring next to FIG. 8, shown is a flowchart 800 that provides one example of the how a client application 133 with the app blocker library 152 can determine whether a user is entitled to access a restricted feature of the client application 133 based on the current working status of a user account and an access policy associated with the client application 133 or restricted feature. The flowchart of FIG. 8 can be viewed as depicting an example of elements of a method implemented by the client application 133 or app blocker library 152. The separation or segmentation of functionality as discussed herein is presented for illustrative purposes only.

In step 801, the app blocker library 152 can detect a request to access a restricted feature of the app blocker library 152. A restricted feature is a feature within the app blocker library 152 for which access is restricted based upon the current working status of a user or an access policy that defines the parameters under which the feature can be accessed.

At step 803, the app blocker library 152 can obtain an access policy from a policy server 121 for the requested feature or for the client application 133. The access policy can be obtained from the policy server 121 upon startup of the client application 133 or another time and cached in the client application 133. The access policy can also be bundled within the client application 133 and need not be requested from the policy server 121 in al implementations.

At step 805, the app blocker library 152 can obtain the current working status of a user account associated with the request. The user account associated with the request can be the user that is currently logged into the client application 133. The user account that is currently logged into the client application 133 can be identified using a user identifier or token that is stored in the client application 133. The user account can also be identified by requesting credentials from the user through a user interface challenge. The current working status can be requested and obtained from the shift status connector 123.

At step 807, the app blocker library 152 can determine from the access policy and the current working status whether the user account is permitted to access the restricted feature of the client application 133. For example, if the access policy specifies that the restricted feature is not permitted to be accessed if a worker is off shift and the current working status indicates that the user account is off shift, access to the restricted feature is denied. If the worker is on shift, access to the restricted feature is granted. If the access policy specifies that the restricted feature is not permitted to be accessed if a worker is off shift and outside of a specified geofence, and the current working status indicates that the user account is off shift or outside of the specified geofence, access to the restricted feature is denied. If the worker is on shift and inside the specified geofence, access to the restricted feature is granted. In some examples, the access policy might specify that all access to the client application 133 is only permitted when the user is on shift. Therefore, the entire client application 133 is considered a restricted feature that can only be accessed according to the access policy and the current working status of a user account. In this scenario, the access policy and current working status of the user account are analyzed by the app blocker library 152 on startup of the application.

At step 809, the app blocker library 152 and/or client application 133 can determine whether access to the restricted feature is permitted based on the determination made in step 807. If access to the restricted feature is permitted, the process proceeds to step 813, where the client application 133 launches the restricted feature. If access is not permitted based on the determination made in step 811, the app blocker library 152 can cause the client application 133 to display a blocker UI 301. In some cases, the app blocker library 152 can suppress one or more notifications or disable the restricted feature of the client application 133 rather than display a visible UI element. In some implementation, the app blocker library 152 can cause the application to exit if access to the restricted feature is not permitted. Thereafter, the process proceeds to completion.

The client devices 106 or devices making up the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 133 and potentially other applications. Also stored in the memory can be a data store 113 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the management service 115, the client application 133, and other various systems described herein can be embodied in software or code executed by general-purpose hardware as discussed above, as an alternative, the same can also be embodied in dedicated hardware or a combination of software/general purpose hardware and dedicated hardware.

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
    at least one computing device comprising at least one processor circuit; and
    program instructions executable by the at least one computing device that, when executed, direct the at least one computing device to:
    detect a shift status update from a time management system, the shift status update associated with a user account in the time management system;
    determine a current working status associated with the user account in the time management system;
    obtain a request to access at least one feature in an application executed by a client device, wherein the application determines whether to permit access to the at least one feature is based on a determination of the current working status associated with the user account that is made within a library provided by a software development kit (SDK) used to generate the application;
    determine that the request is associated with the user account in the time management system, wherein the library provided by the SDK makes a network call to the time management system on behalf of the application; and
    transmit the current working status to the application, wherein the application determines to deny access to a first feature of the application based upon a determination that the current working status indicates that the user account is currently not working and to grant access to a second feature of the application based upon the determination, and the second feature is also available in the application when the current working status indicates that the user account is currently not working, and
    wherein a logic to access the time management system is not bundled within the library, and the library is configured to support other time management systems provided by varying third parties with varying APIs.

2. The system of claim 1, wherein the current working status comprises an indication of whether a user associated with the user account is currently identified as working according to the time management system.

3. The system of claim 1, wherein the current working status comprises an indication of that the user account is designated as on-shift or off-shift.

4. The system of claim 1, the application is instrumented to invoke a functionality of the library by one or more API calls to the library, allowing the application to request the library to make a determination of whether the application should grant an access to a restricted feature within the application.

5. A system, comprising:
    a client device comprising at least one processor circuit; and
    an application executable by the client device that, when executed, directs the client device to:
    detect a request to access a restricted feature of the application, the restricted feature being accessible only when a user account associated with the application is indicated as on-shift;
    query a policy server to retrieve an access policy associated with the user account, the access policy specifying at least one policy regarding when the user account is permitted to access the restricted feature, wherein the application queries the policy server by invoking a library provided by a software development kit (SDK) used to generate the application;
    retrieve a current working status associated with the user account from a time management system, wherein the library provided by the SDK makes a network call to the time management system on behalf of the application;
    determine whether the user account is permitted to access the restricted feature based upon the current working status and the access policy;
    cause access to the restricted feature to be blocked in response to determining that the user account is not permitted to access the restricted feature based upon the current working status and the access policy; and
    grant access to another feature in response to determining that the user account is not permitted to access the restricted feature based upon the current working status and the access policy,
    wherein a second feature is also available in the application when the current working status indicates that the user account is currently not working, and
    wherein a logic to access the time management system is not bundled within the library, and the library is configured to support other time management systems provided by varying third parties with varying APIs.

6. The system of claim 5, wherein the application is instrumented to invoke a functionality of the library by one or more API calls to the library, allowing the application to request the library to make a determination of whether the application should grant an access to a restricted feature within the client application.

7. The system of claim 6, wherein the application further comprises a user interface overlay that blocks visibility of the restricted feature, wherein the application further blocks user input to the restricted feature.

8. The system of claim 5, wherein the application determines to permit access to the restricted feature to be blocked when the current working status indicates that the user account is off shift.

9. The system of claim 5, wherein the application determines to cause access to the restricted feature to be blocked by determining that a location of the client device is outside a geographic boundary specified by the access policy.

10. The system of claim 5, wherein the application determines to cause access to the restricted feature to be unblocked in response to determining that current working status indicates that the user account is on shift.

11. The system of claim 5, wherein the application detects the request to access the restricted feature of the application by detecting an inbound notification to the application, and the application causes the restricted feature to be blocked by suppressing the notification until the current working status indicates that the user account is on shift.

12. The system of claim 5, wherein the application detects the request to access the restricted feature of the application on startup of the application, and the application causes the restricted feature to be blocked by causing the application to exit.

13. A method, comprising:
   detecting a request to access a restricted feature of an application, the restricted feature being accessible only when a user account associated with the application is indicated as on-shift;
   querying a policy server to retrieve an access policy associated with the user account, the access policy specifying at least one policy regarding when the user account is permitted to access the restricted feature by invoking a library provided by a software development kit (SDK) used to generate the application;
   retrieving a current working status associated with the user account from a time management system, wherein the library provided by the SDK makes a network call to the time management system on behalf of the application;
   determining whether the user account is permitted to access the restricted feature based upon the current working status and the access policy;
   causing access to the restricted feature to be blocked in response to determining that the user account is not permitted to access the restricted feature based upon the current working status and the access policy; and
   granting access to another feature in response to determining that the user account is not permitted to access the restricted feature based upon the current working status and the access policy,
   wherein a second feature is also available in the application when the current working status indicates that the user account is currently not working, and
   wherein a logic to access the time management system is not bundled within the library, and the library is configured to support other time management systems provided by varying third parties with varying APIs.

14. The method of claim 13, wherein the application is instrumented to invoke a functionality of the library by one or more API calls to the library, allowing the application to request the library to make a determination of whether the application should grant an access to a restricted feature within the application.

15. The method of claim 13, wherein determining to permit access to the restricted feature to be blocked when the current working status indicates that the user account is off shift.

16. The method of claim 13, detecting the request to access the restricted feature of the application further comprises detecting an inbound notification to the application, and the application causes the restricted feature to be blocked by suppressing the notification until the current working status indicates that the user account is on shift.

17. The method of claim 13, further comprising detecting the request to access the restricted feature of the application on startup of the application, and wherein causing the restricted feature to be blocked comprises causing the application to exit.

* * * * *